(12) United States Patent
Manousakis (10) Patent No.: US 11,325,313 B2
(45) Date of Patent: May 10, 2022

(54) ASSIGNING OBJECT GENERATION TASKS

(71) Applicant: HEWLETT-PACKARD DEVELOPMENT COMPANY, L.P., Houston, TX (US)

(72) Inventor: Stylianos Manousakis, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 369 days.

(21) Appl. No.: 16/089,851

(22) PCT Filed: Apr. 26, 2017

(86) PCT No.: PCT/US2017/029609
§ 371 (c)(1),
(2) Date: Sep. 28, 2018

(87) PCT Pub. No.: WO2018/199938
PCT Pub. Date: Nov. 1, 2018

(65) Prior Publication Data
US 2020/0298495 A1    Sep. 24, 2020

(51) Int. Cl.
*B29C 64/393*    (2017.01)
*B33Y 50/02*    (2015.01)
*G05B 19/4099*    (2006.01)

(52) U.S. Cl.
CPC ............ *B29C 64/393* (2017.08); *B33Y 50/02* (2014.12); *G05B 19/4099* (2013.01); *G05B 2219/49023* (2013.01)

(58) Field of Classification Search
CPC ... B29C 64/393; B33Y 50/02; G05B 19/4099; G05B 2219/49023; Y02P 90/30; G06Q 50/04; G06Q 10/08
See application file for complete search history.

(56) References Cited

U.S. PATENT DOCUMENTS

2007/0282477 A1\* 12/2007 Schmidt .......... G05B 19/41865
700/101
2012/0046779 A1    2/2012 Pax
(Continued)

FOREIGN PATENT DOCUMENTS

CN    104203547 A    12/2014
CN    105518613 A    4/2016
(Continued)

OTHER PUBLICATIONS

Lutters, et al; "3D Nesting of Complex Shapes"; Elsevier; SciVerse ScienceDirect; pp. 26-31; 2012.
(Continued)

*Primary Examiner* — Thomas C Lee
*Assistant Examiner* — Michael Tang
(74) *Attorney, Agent, or Firm* — HP Inc. Patent Development (57) ABSTRACT

In an example, a method includes receiving object model data at a processor, the object model data characterising an object to be generated using additive manufacturing. The method may further include receiving a status indicator for each of a plurality of additive manufacturing apparatus, the status indicator comprising, for each apparatus, an indication of an adaptable build volume. The processor may assign an object generation task corresponding to the received object model data to one of the plurality of additive manufacturing apparatus based on the status indicators.

20 Claims, 4 Drawing Sheets

(56) References Cited

U.S. PATENT DOCUMENTS

| | | | |
|---|---|---|---|
| 2012/0113473 A1* | 5/2012 | Pettis | B33Y 40/00 358/1.15 |
| 2015/0045928 A1 | 2/2015 | Perez et al. | |
| 2015/0057784 A1* | 2/2015 | Butler | G06F 3/1262 700/119 |
| 2015/0197062 A1 | 7/2015 | Shinar et al. | |
| 2016/0046074 A1* | 2/2016 | Jang | G05B 19/4099 700/119 |
| 2016/0185044 A1* | 6/2016 | Leonard | G05B 15/02 700/98 |
| 2016/0209819 A1 | 7/2016 | Cudak et al. | |
| 2016/0271881 A1 | 9/2016 | Bostick et al. | |
| 2016/0311159 A1 | 10/2016 | Spanier et al. | |
| 2016/0361878 A1 | 12/2016 | Gain | |
| 2017/0173888 A1* | 6/2017 | Thomas-Lepore | H04N 1/4433 |
| 2018/0117847 A1* | 5/2018 | Ohi | B29C 64/112 |
| 2018/0157242 A1* | 6/2018 | Jung | B29C 64/386 |
| 2019/0105845 A1* | 4/2019 | Osawa | B29C 64/386 |

FOREIGN PATENT DOCUMENTS

| | | |
|---|---|---|
| CN | 106444634 A | 2/2017 |
| CN | 106462994 A | 2/2017 |
| CN | 106503883 A | 3/2017 |
| EP | 2065772 A2 | 6/2009 |
| WO | WO-2016032544 A1 * 3/2016 ............. G06T 19/20 |
| WO | WO-2016053263 A1 | 4/2016 |

OTHER PUBLICATIONS

Vassilios Canellidis, et al: "Efficient Parts Nesting Schemes for Improving Stereolithography Utilization", Computer Aided Design; vol. 45, No. 5; May 31, 2013; pp. 875-886.

Yicha Zhang, et al: "Grouping Parts for Multiple Parts Production in Additive Manufacturing", Procedia Cirp; vol. 17, Dec. 31, 2014; pp. 388-313.

Lovell, "'On-The-Fly' 3-D Print System Prints What You Design, As You Design It", Retrieved from Internet: https://techxplore.com/news/2016-05-on-the-fly-d.html, May 31, 2016, 2 pages.

"Additive Manufacturing—Significantly Reduces Schedule and Cost", pp. 1-47.

D'Aveni, "The 3-D Printing Revolution", Harvard Business Review, Retrieved from Internet: https://hbr.org/2015/05/the-3-d-printing-revolution, May 2015, 12 pages.

* cited by examiner

ASSIGNING OBJECT GENERATION TASKS

BACKGROUND

Additive manufacturing techniques may generate a three-dimensional object through the solidification of a build material, for example on a layer-by-layer basis. In examples of such techniques, build material may be supplied in a layer-wise manner and the solidification method includes heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. A coloring agent, for example comprising a dye or colorant, may in some examples be used as a fusing agent or a coalescence modifier agent, and/or as a print agent to provide a particular color for the object. Print agents may control or influence other physical or appearance properties, such as strength, resilience, conductivity, transparency, surface texture or the like.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

In some examples set out herein, it may be intended to generate a number of objects in a single, common, build process within a particular additive manufacturing apparatus. This may for example increase the throughput of an additive manufacturing apparatus and/or increase energy efficiency. Moreover, it may be intended to provide a pool of additive manufacturing apparatus, each of which may accept an object generation task.

The processing of a given build volume in which objects are generated may take many hours, depending, for example, on the type of additive manufacturing system used and the size of the build volume. Accordingly, once an additive manufacturing system has started to process a build volume, the additive manufacturing system is effectively busy until the whole build volume has been processed, or unless the build process is cancelled. However, cancelling processing of a build volume may result in a significant loss of time, and any objects not fully generated within the build volume will be incomplete. Furthermore, cancelling the processing of a whole build volume may result in significant loss of build material.

Figure 1:
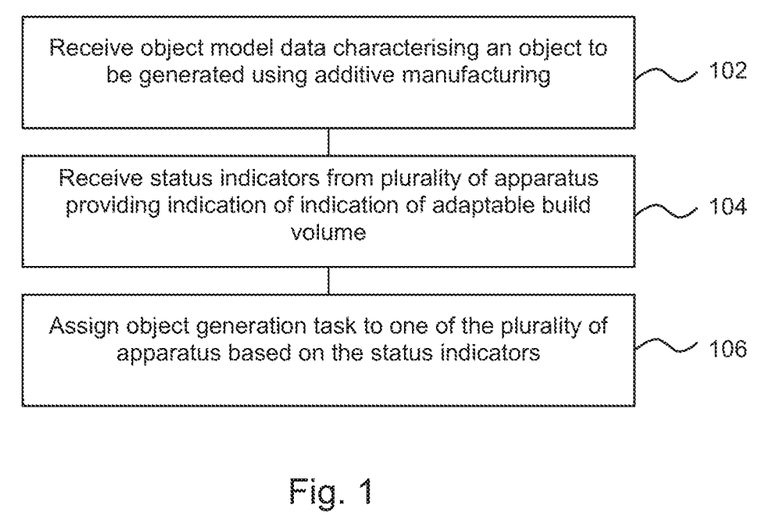
FIG. 1 is an example method of handling data for additive manufacturing.

FIG. 1 is an example of a method, which may be a computer implemented method, and/or a method of assigning an object generation task to one of a plurality of additive manufacturing apparatus. Block 102 comprises receiving object model data at a processor, the object model data characterising an object to be generated using additive manufacturing. The object model data may characterise a whole object, and may be a new request to generate an object, or may describe just part of an object. In some examples, the object model data may characterise an adaptation to an object which has previously been submitted for object generation. For example, this could be a change in the properties such as an appearance and/or a functional property of an apparatus, or a change in the geometry thereof. In some examples, the object model data may comprise a request to provide a further instance of an object for which object model data has previously been submitted.

Block 104 comprises receiving a status indicator for each of a plurality of additive manufacturing apparatus, the status indicator comprising, for each apparatus, an indication of an adaptable build volume. For example, this may indicate whether that apparatus is currently in use for object generation and if so, the point which has been reached in the build procedure. For example it may be that a number of layers of a build volume have been generated but that the upper layers of the corresponding virtual build volume have yet to be generated. In such an example, the upper layers may provide an adaptable build volume, in that changes may be made to the content thereof without affected the previously generated layers. In some examples, it could be that an object has been partially generated in the lower layers: in such an example, at least to the extent that object is intended to occupy further layers, that portion of the un-fabricated build volume may be designated as non-adaptable (although in other examples, the object generation process may be interrupted so as to provide a larger adaptable volume).

In some examples, the adaptable build volume of an additive manufacturing apparatus may be determined to respect a predetermined spacing provided so as to thermal separation between objects, and/or to facilitate the post processing of objects. Thus, an empty space within a virtual build volume may not be an adaptable portion thereof.

In some examples, an adaptable volume may be associated with intended object(s) for object generation. For example, it may originally be intended to print such object(s) within the build volume. However the volume may be adaptable in that there may be space between the objects within the build volume, and/or in that the objects may be modified, repositioned or reoriented, or removed from a virtual build volume to accommodate a new object generation task. The status indictor may for example comprise an indication of the space available (in some examples following repositioning or removal of at least one object), and/or an indication of at least one object which may be removed.

At least some of the plurality of additive manufacturing apparatus may be in a common location, such as a factory or the like, and/or may be geographically dispersed over different locations. This therefore allows a plurality of additive manufacturing apparatus to 'advertise' available space, for example to increase utilisation thereof. It may be noted that for some additive manufacturing techniques, the formation of a layer may occur in a substantially fixed timeframe and at a similar cost and resource use, regardless of what portion of the layer constitutes part of an object. Thus is may be intended to maximise utilisation of space within such apparatus.

As is further set out below, the status indicators are used to assign an object generation task to an additive manufacturing apparatus according to its suitability to generate the object and/or to increase the throughput of a production pipeline, or the like. To that end, a status indictor may comprise additional data to assist in determining to which additive manufacturing apparatus an object generation task is to be assigned.

The status indicators may for example comprise an indication of a priority level or a manufacturing deadline for objects currently under generation. In some examples, the status indicators may indicate conditions for accepting an object generation task (e.g. for higher priority or shorter deadline objects than those already assigned), and/or performance capabilities of the associated additive manufacturing apparatus. The status indicators may provide an indication of manufacturing cost, location or the like.

In some examples, there may be a consideration of the predicted 'yield' of a build operation, i.e. the number of objects which meet quality standards. For example, increasing the object density within a build volume may increase the number of objects but may also increase a risk that objects may fail to meet quality standards (i.e. if object density is increased to beyond a threshold, the object yield may decrease). The threshold may vary based on the apparatus. In some examples, the status indicator may comprise an indication of the current object density and of any known parameters regarding the appropriate object density for the associated apparatus may be provided. For example, this may allow for balancing of object density between additive manufacturing apparatus while maintaining object quality.

In some examples, a status indicator may comprise an indication of the post-processing capability available to an additive manufacturing apparatus. For example, build material extraction apparatus and/or object cleaning apparatus may be provided in a same location as the additive manufacturing apparatus, and the capacity of such apparatus may be provided so as not to assign an object generation task to an apparatus which may result in delays at that stage in the object generation pipeline. In some examples, there may be an option of 'fast cooling' available, and the status indicator may include this information. In some examples transport capacity, away from the location of an additive manufacturing apparatus may be included.

In some examples, a status indicator may indicate a type of object already included in an intended build volume, for example comprising information about the intended object properties. For example, this may allow objects to be grouped according to properties and/or materials, which may aid manufacturing efficiency.

In some examples, the status indicators may be sent from the additive manufacturing apparatus. In other examples, the status indicators may be generated from an additive manufacturing managing facility which may control or otherwise interact with additive manufacturing apparatus and/or may be based on instructions sent to the additive manufacturing apparatus, for example in conjunction with a time lapse since the instructions were sent from which a build progress may be inferred.

Block 106 comprises assigning an object generation task to one of the plurality of apparatus based on the status indicators.

Thus, by using the status indicators, an object generation task may be assigned to an additive manufacturing apparatus which is capable of accommodating it and utilisation of a set of additive manufacturing apparatus may be increased.

In some examples, the accommodation of the object generation task may comprise reconfiguring a portion of a virtual build volume corresponding to at least part of the adaptable volume.

In an example in which the object model data characterises an adaptation to an object which has previously been submitted for object generation, the object generation task may be assigned to the additive manufacturing apparatus to which the object has previously been submitted unless the relevant object (or portion thereof) has already been generated, in which an object generation task specifying the regeneration or the object as whole may be assigned to an additive manufacturing apparatus which is capable of accommodating it.

In some examples there may be more than one apparatus which could accommodate the object generation task. In such cases, the object generation task may be assigned to an apparatus on a random basis or depending on a build completion time, or in some other manner (for example, cost, apparatus performance, location, impact on object quality, efficiency or the like). For example, to increase throughput (which may therefore consider both object generation and post-processing such as cooling and the like), the object generation task may be assigned to an apparatus which is likely to complete the manufacturing thereof soonest (for example, is the furthest through its build process). In other examples, efficiency of use of object generation materials may be considered and a task may be assigned to an available apparatus which is generating similar objects over an apparatus which is generating dissimilar (or less similar)

objects. In other words, object generation tasks may be grouped on similarity, for example by properties, materials and/or function.

In some examples, the selection of an additive manufacturing apparatus may take account of the post processing capacity, which as noted above may be provided as part of a status indication. For example, the usage of additive manufacturing apparatus which has a relatively limited amount of post processing capability may in some cases be optimised (i.e. the build density may be intended to be at or close to a maximum) to take full advantage of such apparatus. In another example, for example where there is no constraint on post processing capacity, the additive manufacturing apparatus which is able to locate the object so as to result in a minimum increase in the overall height of the build volume to be generated may be selected (as this may allow the build to finish earlier and/or shorten cooling time). The apparatus which results in a minimal object generation total build volume height may be selected for the task as such object generation tasks may be quicker (and may leave more of an adaptable volume for further tasks).

In other examples, an assessment may be made as to which apparatus can accommodate the task with low, or the least, risk to part quality or 'yield', and the task assigned accordingly.

In summary then, the method may comprise assigning the task to one of a plurality of apparatus which could accommodate the task randomly, or based on any or any combination of criteria comprising: a determination of a similarity of objects under generation by an additive manufacturing apparatus to the object generation task to be assigned, a consideration of a resulting packing density within the apparatus, a consideration of a resulting overall build height, a consideration of post processing capacity associated with the apparatus, a target completion time of the object generation task, a cost of object generation, a location of the additive manufacturing apparatus (e.g. proximity to an intended recipient of the object) or the like. In some examples, the status indicator may comprise information to allow the processor to assign the task on such criteria.

Figure 2:
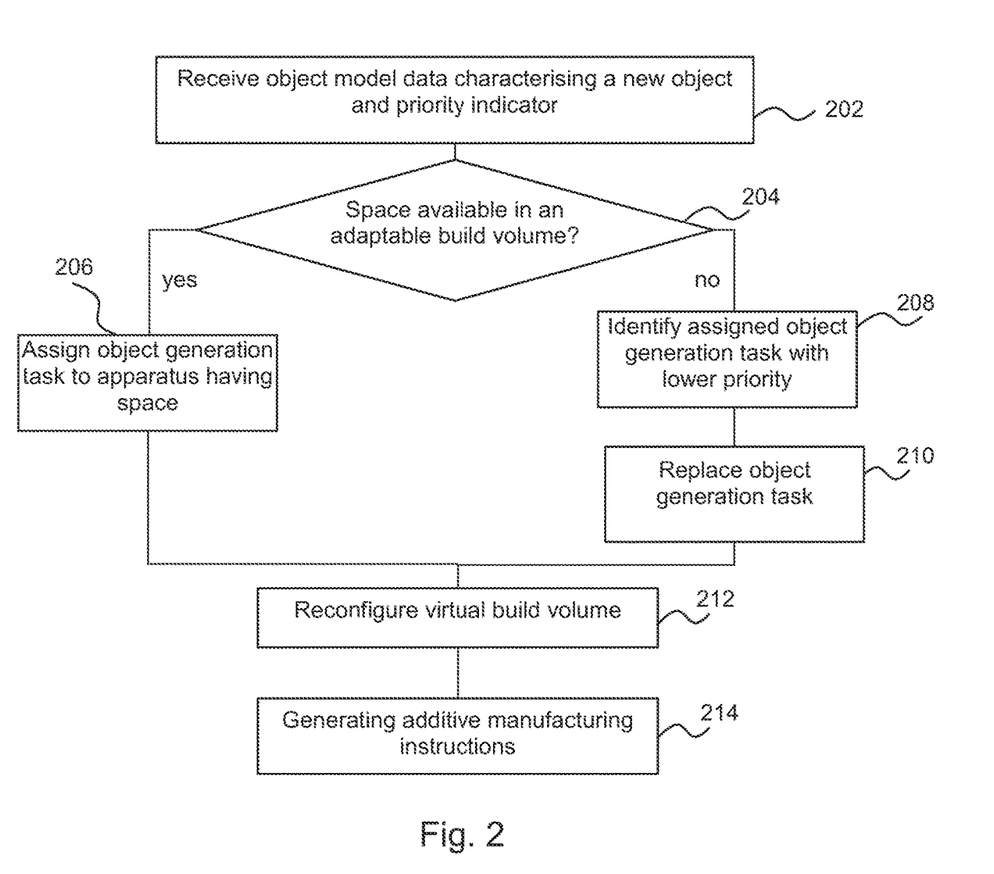
FIG. 2 is an example method of generating additive manufacturing instructions.

FIG. 2 is an example of a method in which object model data characterising a new object is received in block 202, along with priority indicator.

Such a priority indicator may be utilised such that assigning the object generation task to one of the plurality of apparatus is based on the status indictor and the priority indicator. For example, a processor carrying out the method may receive or hold priority indicators for the objects under generation. In some examples, such priority level(s) may be included in a status indicator for an additive manufacturing apparatus. The priority level may be utilised such that lower priority objects may be removed from a virtual build volume (i.e. a model of a build volume which is to be generated using additive manufacturing), or the generation of a lower priority object may be abandoned, in order to accommodate higher priority objects. In some examples, the priority indictor may be an indication of a manufacturing deadline, and objects with an earlier deadline may be prioritised over objects with a later deadline.

In this example, the method comprises, in block 204, determining if an object generation task may be assigned to a space in an adaptable build volume. This may comprise, for example, identifying an existing free volume which is large enough to accommodate the new object, or may comprise carrying out an object packing task, or finite element analysis task, in relation to each of the adaptable build volumes given their previously assigned intended content and the received object model data to determine if the objects may be rearranged to generate a space to accommodate the new object. If the object can be accommodated in such an apparatus, a corresponding object generation task is assigned to the apparatus in block 206.

Where there is more than one apparatus which could accommodate the object generation task, the object generation task may be assigned to an apparatus on a random basis or based on any of the criteria mentioned above.

If there is no space in an adaptable build volume available, block 208 comprises identifying an object generation task already assigned to an apparatus, wherein the object generation task is intended to take place within an adaptable build volume, and the object generation task is associated with a lower priority than the received priority indicator and block 210 comprises assigning an object generation task corresponding to the received object model data to that apparatus and removing the previously intended object generation task (i.e. the task is effectively replaced). In some examples, if more than one apparatus is due to complete such a low priority task, the lowest priority task may be replaced, or a selection may be made randomly or based on any, or any combination of, the criteria mentioned in relation above.

Block 212 comprises reconfiguring a virtual build volume of the apparatus to which the object generation task is assigned (be this to add a new object generation task to a region of the virtual build volume which was previously unoccupied, to reconfigure an arrangement to create a space of previously assigned objects and/or to replace one or more object). Block 214 comprises generating additive manufacturing instructions for at least part of the reconfigured virtual build volume. In some examples, manufacturing instructions for an object generation task may be generated while at least part of the build volume to which the object generation task is assigned is itself already under generation (i.e. an object may be modified or added to a build volume during the manufacturing time). In some examples, block 214 may be carried out by additive manufacturing apparatus.

In some examples, additive manufacturing instructions may be generated on a layer-by-layer basis, and in some examples, this may be in a 'just in time' basis. This may increase the agility of the apparatus—for example, it may mean that new additive manufacturing instructions are not generated following each configuration or reconfiguration of a build volume, but are instead generated in a layer-wise manner (or in blocks of a few layers) which anticipates the manufacture of an object layer so that the instructions are available to allow a continuous generation process. By staggering the generation of additive manufacturing instructions throughout a build process, this means that, if a reconfiguration is applied to a virtual build volume, the instructions in relation to that portion of the build volume will not have been generated (and therefore utilised processing resources) to then be discarded.

In some examples, the method may be carried out such that the fabrication of layers is substantially continuous, and/or such that each layer is fabricated in substantially the same time frame. Some additive manufacturing techniques, such as selective laser sintering and powder-based three-dimensional printing system, may be sensitive to delays introduced between the processing of successive layers of build material. For example, inter-layer object strength may be related to the temperature at which layers of build material, or different portions of layers of build material are maintained.

In some examples, in order ensure a consistent pipeline flow of instructions for object generation is received, the method may effectively 'lock' a portion of a virtual build volume (for example so that a corresponding portion of the build volume is designated as 'non-adaptable') with a sufficient advance time to allow the additive manufacturing instructions to be generated without an interruption in object generation.

By adding to, reconfiguring and/or replacing previously allocated object generation tasks, a time delay between an object generation request and completion of manufacture for some objects may be significantly shortened.

As briefly mentioned above, in some examples, objects may be assigned to an additive manufacturing apparatus having a build completion time which is before a manufacturing deadline and/or as soon as possible. For example, this may comprise determining, for a high priority object, which of the apparatus to which the object generation task could be assigned is closest to finishing (which may comprise a consideration of the overall height of the object generation activity being performed thereby), with the object being placed in or near the final few layers of the virtual build volume.

In some examples, objects which are removed from a build volume to accommodate a new object (for example, a higher priority object) may be reassigned to another apparatus. By pooling the build volumes of a plurality of additive manufacturing apparatus, objects may be manufactured efficiently, for example in a 'just in time' manner.

Figure 3:
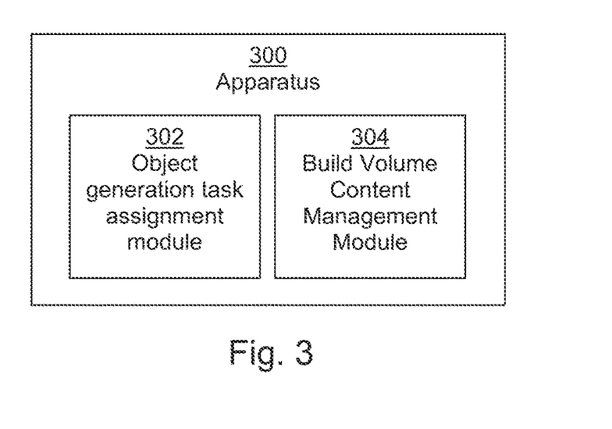
FIGS. 3 and 4 are schematic drawings of examples of apparatus for processing data for additive manufacturing.

FIG. 3 is an example of an apparatus 300 comprising an object generation task assignment module 302, and a build volume content management module 304. The object generation task assignment module 302 assigns an object generation task to one of a plurality of additive manufacturing apparatus. The build volume content management module 304 identifies an adaptable build volume in the plurality of additive manufacturing apparatus. In some examples, the build volume content management module 304 may model a content of a portion of a virtual build volume of one or more of the plurality of additive manufacturing apparatus, for example determining a relative placement for objects within the fabrication chamber/virtual build volume.

The object generation task assignment module 302 may assign an object generation task to one of a plurality of additive manufacturing apparatus based on a determination by the build volume content management module 304 as to whether there is sufficient space to accommodate the object, if a reconfiguration of the previously specified objects which frees up sufficient space may be carried out, and/or if a higher priority task is to supplant or replace a lower priority task, for example as described above in relation to FIGS. 1 and 2. This determination may follow a modelling of a revised content by the build volume content management module 304. In some examples, models of a plurality of virtual build volumes may be considered and an additive manufacturing apparatus selected for the task based on a comparison of the models.

In some examples, virtual build volumes may be divided into a 'ready to fabricate' portion and a 'not ready to fabricate' portion, the object generation pipeline may continue, for example by the generation of control instructions for a ready to fabricate portion while changes may be made to the remaining portion of the virtual build volume(s). In some examples, the portion of the build volume which is not designated as ready to fabricate may be made available to an operator or a customer of an object generation process, who may be able to add or alter an intended content of the build volume.

Figure 4:
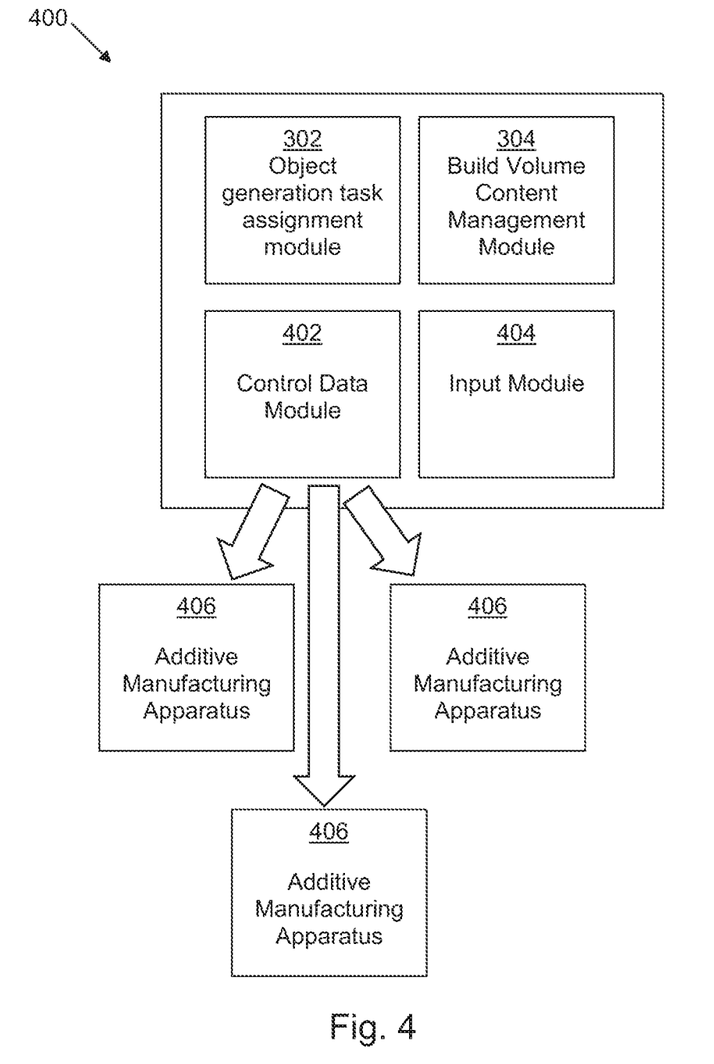

FIG. 4 is an example of apparatus 400 comprising processing circuitry comprising, in addition to the object generation task assignment module 302 and the build volume content management module 304 of FIG. 3, a control data module 402 and an input module 404. Also provided as part of the apparatus 400 is a plurality of additive manufacturing apparatus 406. At least some of the additive manufacturing apparatus 406 may be collocated in a region, for example within a manufacturing centre such as a factory, and/or may be dispersed over a wide area, for example being in different geographical areas such as different cities, towns or countries, or the like.

The control data module 402 generates control instructions from data designated as ready for fabrication, for example from at least one model of at least part of a virtual build volume modelled by the build volume content management module 304, and sends the data to the additive manufacturing apparatus 406 which is to build objects corresponding to the data, as assigned by the object generation task assignment module. In other examples, such a control data module 402 may be provided in association with, or as part of, the additive manufacturing apparatus 406. For example, each additive manufacturing apparatus 406 may comprise a control data module 402, which may take into consideration local device parameters such as thermal calibration, any dimensional calibration of the device, color management etc. In such examples, the build content management module 304 may send a model of at least part of a virtual build volume, and the control instructions may be generated based on this model. In other examples, there may be centralised control data module 402 as shown and localised control data modules associated with (and in some examples, comprising part of) additive manufacturing apparatus 406 which adapt centrally produced control data for the associated additive manufacturing apparatus 406.

In some examples, the build volume content management module 304 and the control data module 402 are to operate at least partially concurrently, for example such that control data may be generated and sent to different additive manufacturing apparatus in an overlapping time frame. Data may be supplied to control data module 402 once it is designated as describing a portion of a virtual build volume as ready to fabricate in object generation, for example under the control of the build volume content management module 304, or based on a flag set thereby, or the like.

The input module 404 may receive data modelling at least part of an object to be generated and a status indicator comprising an indication of an adaptable build volume of at least one (and in some examples a plurality of) additive manufacturing apparatus. The build volume content management module 304 may determine if the data received models an object or object portion which can be generated with a previously indicated build volume content of at least one apparatus, and the object generation task assignment module 302 may assign the object generation task to an apparatus based on the determination.

In some examples, the status indicator may comprise an indication of a post processing capability associated with the additive manufacturing apparatus and/or an indication of a build volume content under generation by the additive manufacturing apparatus. For example, this may comprise an indication of the functionality or materials of generation, the height of a build operation, the priority and/or manufacturing time limit associated with objects under generation, a target or predicted manufacturing completion time, or the like.

The additive manufacturing apparatus 406 generate objects using the control instructions. The additive manufacturing apparatus 406 may generate the objects in layer-wise manner by selectively solidifying portions of layers of build materials. The selective solidification may in some examples be achieved by selectively applying print agents, for example through use of 'inkjet' liquid distribution technologies, and applying energy, for example heat, to each layer. The additive manufacturing apparatus 406 may comprise additional components not shown herein, for example a fabrication chamber, a print bed, a print head for distributing print agents, a build material distribution system for providing layers of build material, energy sources such as heat lamps and the like.

The data modelling at least part of an object to be generated received by the input module 404 may represent a new object for generation, or an alteration of a previously specified object. This data may be provided as object model data representing at least a portion of an object to be generated by an additive manufacturing apparatus by fusing build material. The object model data may for example comprise a Computer Aided Design (CAD) model, and/or may for example be a STereoLithographic (STL) data file. In some examples, an object portion may comprise a layer of an object, for example a layer to be formed in a layer-by-layer manufacturing process such as additive manufacturing.

Figure 5:
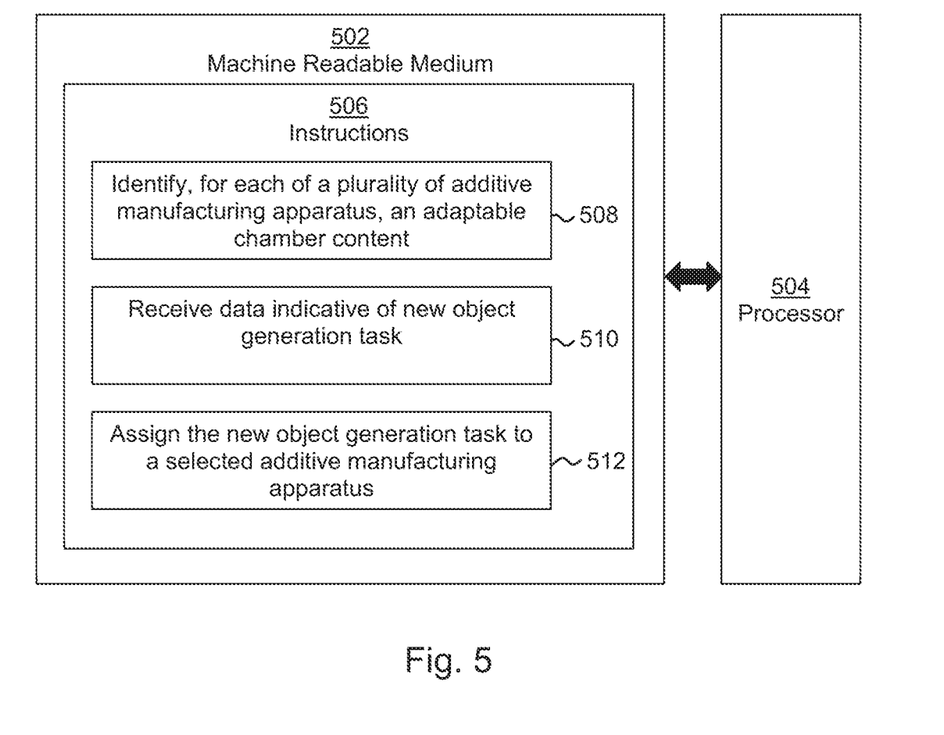
FIG. 5 is a simplified schematic drawing of an example machine readable medium in conjunction with a processor.

FIG. 5 shows an example of a machine readable medium 502 in association with a processor 504. The machine readable medium 502 comprises instructions 506 which, when executed by the processor 504, cause the processor 504 to carry out certain tasks.

The instructions 506 comprise instructions 508 to identify, for each of a plurality of additive manufacturing apparatus, an adaptable chamber content.

The instructions 506 further comprise instructions 510 to receive data indicative of a new object generation task. This may for example comprise object model data representing at least a portion of an object to be generated by an additive manufacturing apparatus by fusing build material. The object model data may for example comprise CAD model, and/or may for example be a STL data file. In some examples, an object portion may comprise a layer of an object, for example a layer to be formed in a layer-by-layer manufacturing process such as additive manufacturing.

The instructions 506 further comprise instructions 512 to assign the new object generation task to a selected additive manufacturing apparatus which has an adaptable chamber content which is adaptable to accommodate the task (e.g. by addition of the new task, in some examples following reconfiguration and/or replacement of a previously assigned task). In some examples, assigning the task may comprise determining a placement of the objects, (i.e. their intended positions within a fabrication chamber), which may be determined so as to maximise object density within a fabrication chamber while maintaining sufficient spacing bearing in mind thermal considerations and post processing of the objects. In some examples, there may be a constraint on object placement, for example the rotation thereof (for example, in some apparatus, a flat object may be constrained to a rotational range to avoid manufacturing artefacts). The relative placement may be determined by solving a 'packing problem'. Packing problems may be addressed using a range of techniques and for example using a processing apparatus such as a computer or the like. Increasing the object 'nesting' density may increase the number of objects while maintaining an adequate spacing ensure that the number of fabricated objects which meet quality criteria, which may be referred to as object yield, is not unduly adversely affected.

In examples where more than one generation apparatus may be utilised to carry out the task, a selection may be made based on criteria such as the similarity of objects under generation, the resulting packing density, the resulting overall build height, post processing capacity, relative priority levels and/or target completion times of objects, cost and the like.

The instructions 506 may further comprise instructions to cause the processor 504 to release data characterising a finalised adapted chamber content to a processor (which may be a different processor) to generate additive manufacturing instructions, where the data is released while an object generation task is on-going.

In some examples, the machine readable medium 502 comprises instructions 506 to carry out at least one of, or combinations of, the blocks described above in relation to FIG. 1 or FIG. 2.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus functional modules of the apparatus (such as the object generation task assignment module 302, build volume content management module 304, the control data module 402 and/or the input module 404) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims, in any combination.

The invention claimed is:

1. A method comprising:
   receiving object model data at a processor, the object model data characterising an object to be generated using additive manufacturing;
   receiving, at the processor, a status indicator for each of a plurality of additive manufacturing apparatus each having a respective total build volume, the status indicator comprising, for each apparatus, an indication of an adaptable build volume within the total build volume, the adaptable build volume being based on model data for an object or objects already being processed for formation in the build volume and an upper portion of the total build volume below which some number of previously generated layers contain a portion of the object or objects being formed in the total build volume, and the adaptable build volume indicated by the status indicator including an indication of space within a number of upper layers of the total build volume yet to be formed such that changes to planned content of the number of upper layers may be made without affecting the previously generated layers;
   determining, based on the status indicators, whether the received object model data can be assigned to any of the additive manufacturing apparatus for production of the object in the adaptable build volume of that apparatus as indicated by the corresponding status indicator; and
   assigning, by the processor, an object generation task corresponding to the received object model data to one of the plurality of additive manufacturing apparatus based on the status indicators for physical production of the object corresponding to the object model data.

2. A method according to claim 1 wherein the object model data characterises a modification to an unformed portion of the object.

3. A method according to claim 1 wherein the object model data is associated with a priority indicator and assigning the object generation task to one of the plurality of apparatus is based on the status indicator and the priority indicator.

4. A method according to claim 3 comprising replacing an object generation task already assigned to an apparatus when a higher priority object generation task is received, the status indicator including an indication of at least one object currently planned for the adaptable build volume that can be removed from the planned content of the adaptable build volume in favor of a higher priority task.

5. A method according to claim 1 wherein the adaptable build volume reported by the status indicator excludes spacing to provide thermal separation between objects or to facilitate post-processing of objects that is not adaptable.

6. A method according to claim 1 wherein the status indicator further indicates possible repositioning of objects planned in the adaptable build volume to accommodate an additional object generation task in the adaptable build volume.

7. The method of claim 1, further comprising using the status indicator to advertise available space amongst the plurality of additive manufacturing apparatus to increase utilization of the apparatus collectively and overall throughput.

8. Apparatus comprising:
   a processor; and
   an interface providing communication through a cloud between the processor and a plurality of additive manufacturing apparatus;
   the processor programmed to implement a number of modules comprising
   an object generation task assignment module to assign an object generation task to one of the plurality of additive manufacturing apparatus each having a respective total build volume;
   a build volume content management module to receive a status indicator from each of the plurality of additive manufacturing apparatus to identify an adaptable build volume, respectively, within the total build volume in each of the plurality of additive manufacturing apparatus, the status indicator indicating adaptable build volume based on
   model data for a specified object already being processed for formation in the build volume, including whether the specified object may be repositioned or omitted, and
   space in the total build volume above space already used for production of the specified object,
   wherein the object generation task assignment module determines, based on the status indicators, whether the object generation task can be assigned to any of the additive manufacturing apparatus for production of the corresponding object in the adaptable build volume of that apparatus as indicated by the corresponding status indicator and assigns the object generation task based on the adaptable build volume identified in at least one of the plurality of additive manufacturing apparatus; and
   a control data module to generate control instructions via the interface for the at least one of the plurality of additive manufacturing apparatus to produce a desired physical object of the object generation task.

9. Apparatus according to claim 8, further comprising an input module to receive data modelling at least part of an object to be generated and the status indicators.

10. Apparatus according to claim 9, in which the status indictor comprises at least one of:

an indication of a post processing capability associated with a corresponding additive manufacturing apparatus; and an indication of a current object density; and the object generation task assignment module is to assign the object generation task based on the status indicator and the determination of the build volume content management module.

11. Apparatus according to claim 8, wherein the build volume content management module is to determine a relative placement for objects within a adaptable build volume.

12. Apparatus according to claim 8, wherein the control instructions from the control data module comprise a change to a geometry of the specified object when a portion of the specified object has already been formed, the desired physical object being the specified object with the change in geometry.

13. Apparatus according to claim 8, wherein each status indicator further comprises an indication of space allocated between objects for thermal separation or post processing that is excluded from the adaptable build volume.

14. Apparatus according to claim 8, in which the object generation task assignment module is to assign the object generation task to one of the plurality of additive manufacturing apparatus based on at least one of:
   a similarity of objects under generation by that additive manufacturing apparatus to the object to be generated in the object generation task;
   a resulting packing density within the additive manufacturing apparatus;
   a resulting overall build height,
   a post processing capacity associated with the additive manufacturing apparatus,
   a relative priority level of an object generation task of the additive manufacturing apparatus and the object generation task to be assigned;
   a target completion time of the object generation task;
   a predicted completion time of a build process of the additive manufacturing apparatus; and
   a location of the additive manufacturing apparatus.

15. Apparatus according to claim 8, further comprising a non-transitory machine readable medium comprising instructions which, when executed by the processor, cause the processor to:
   identify, for each of the plurality of additive manufacturing apparatus, an adaptable build volume;
   receive data indicative of a new object generation task; and
   assign the new object generation task to a selected additive manufacturing apparatus which has an adaptable build volume which is adaptable to accommodate the new object generation task.

16. Apparatus according to claim 15 further comprising instructions which, when executed by the processor, cause the processor to:
   use data characterising a finalised adapted build volume to generate additive manufacturing instructions, where the additive manufacturing instructions are released while an object generation task is on-going in the selected additive manufacturing apparatus.

17. A method comprising:
   receiving object model data at a processor, the object model data characterizing an object to be generated using additive manufacturing;
   from the object model data, generating processing data for only a part of the layers available in a total build volume of an additive manufacturing apparatus and sending the data for less than all of the available build volume to the additive manufacturing apparatus to begin execution of the processing data;
   receiving, at the processor, a status indicator for the manufacturing apparatus, the status indicator comprising an indication of an adaptable build volume that defines a space within total build volume minus space in the total build volume already used for production of the object;
   assigning, by the processor, an object generation task to supplement the previously sent processing data, the object generation task corresponding to the received object model data or second received object model data, the object generation task being sent to the additive manufacturing apparatus based on the status indicator, the apparatus receiving the object generation task having adaptable build volume that will accommodate the object or objects to be generated so as to produce the object requested by receipt of the object model data.

18. The method of claim 17, wherein assigning the object generation task is performed while an additive manufacturing apparatus selected to receive the object generation task is already performing an earlier object generation task in a lower portion of a build volume, the assigned object generation task being added to the adaptable build volume in an upper portion of the build volume of the selected additive manufacturing apparatus.

19. The method of claim 17, wherein the status indicator further comprises an indication of a priority level or manufacturing deadline for objects currently being generated by the additive manufacturing apparatus.

20. The method of claim 17, further comprising abandoning generation of a lower priority object being produced in an additive manufacturing apparatus to increase adaptable build volume.

* * * * *